Jan. 8, 1924. 1,479,971
A. T. STURT ET AL
CLUTCH
Filed Aug. 17, 1921 2 Sheets-Sheet 2
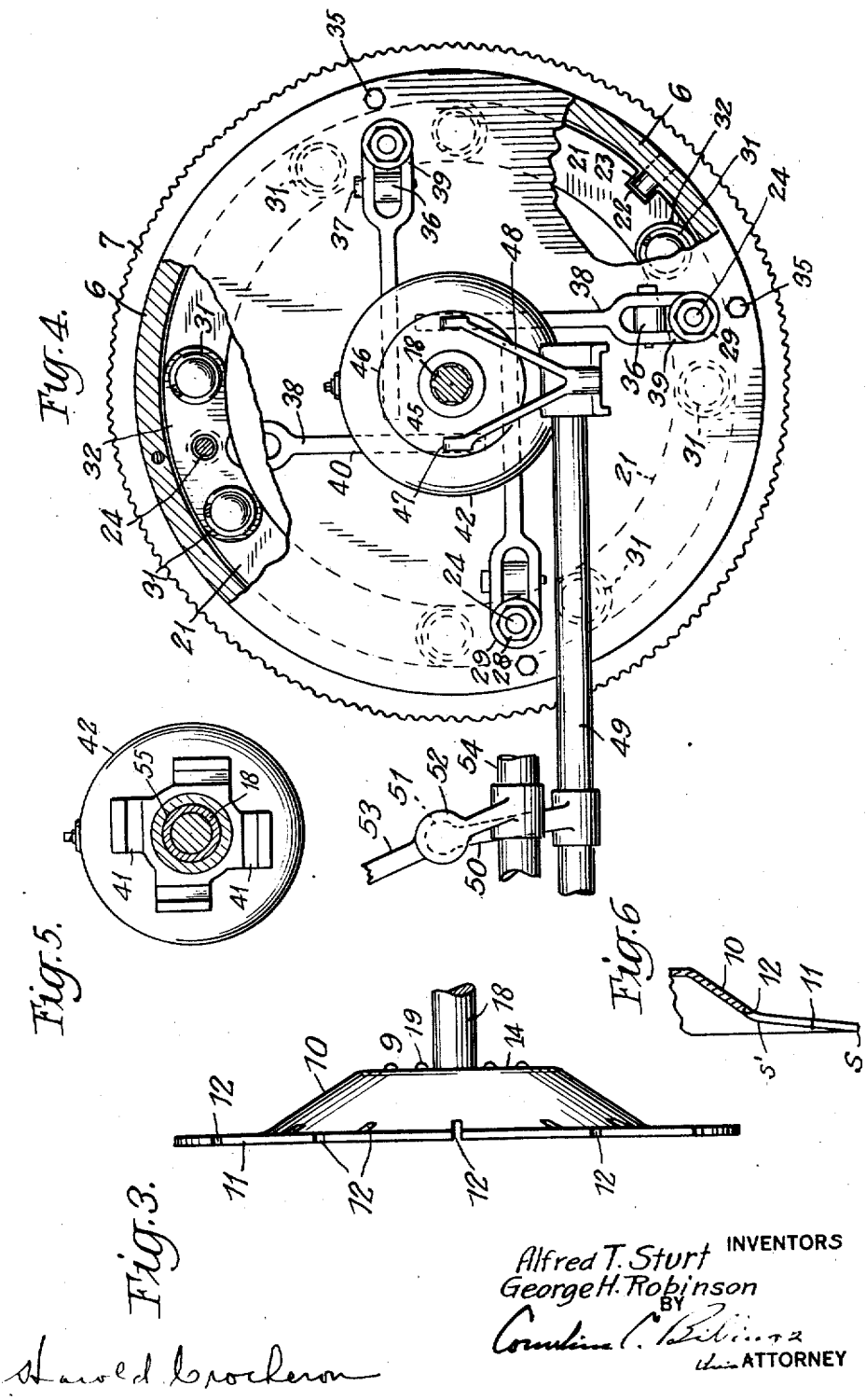
INVENTORS
Alfred T. Sturt
George H. Robinson
BY
ATTORNEY Patented Jan. 8, 1924.

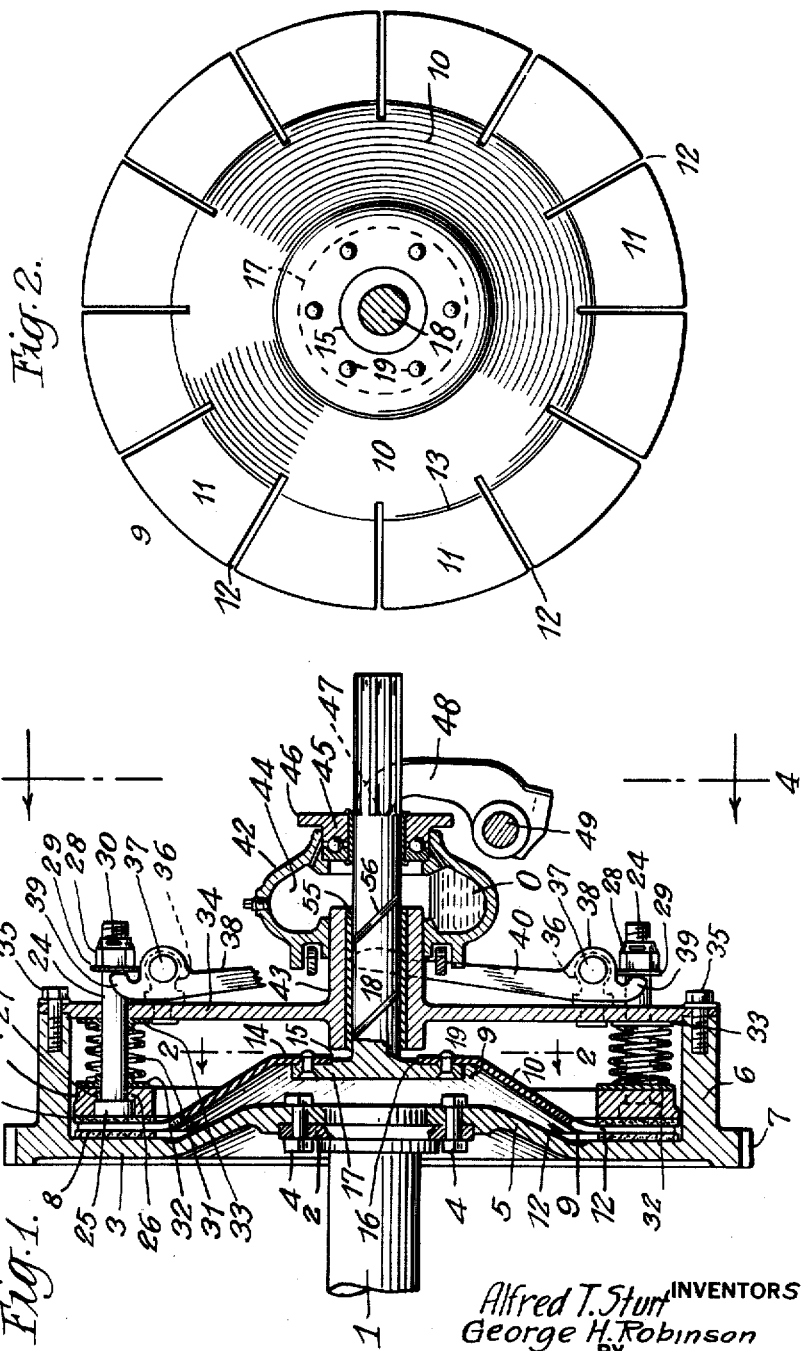

1,479,971

UNITED STATES PATENT OFFICE.

ALFRED T. STURT, OF FLINT, MICHIGAN, AND GEORGE H. ROBINSON, OF NEW YORK, N. Y., ASSIGNORS TO DURANT MOTORS INCORPORATED, A CORPORATION OF DELAWARE.

CLUTCH.

Application filed August 17, 1921. Serial No. 492,949.

*To all whom it may concern:*

Be it known that we, ALFRED T. STURT and GEORGE H. ROBINSON, citizens of the United States, and residents, respectively, of Flint, county of Genesee, State of Michigan, and borough of Manhattan, city and State of New York, have jointly invented certain new and useful Improvements in Clutches, of which the following is a specification.

This invention relates to an improved clutch adapted for use on motor vehicles and designed to effect gradual engagement between the driving member and a driven member without the use of numerous and costly parts that have been found necessary to use in clutches as heretofore used.

One of the objects of the invention is to so construct the clutch that the pick-up is gradual and smooth and yet when the clutch is fully engaged it effectively holds the driving and driven elements in such positive engagement that the torque transmitted is substantially the same as that of the driving shaft. In other words, the arrangement is such that the pick-up is smooth and gradual so that undue shocks are not transmitted to the driven mechanism.

Another object is to provide a clutch that will gradually pick up its load and yet not slip when fully engaged.

A further object is to provide a driven member including a disc which is kerfed to provide a resilient or yielding portion to permit the disc to pick up the load gradually and to compensate for any inequalities in the surface which it is adapted to engage.

A still further object is to form this disc with a central conoidal portion and an outer substantially flat disc-like portion having a plurality of kerfs cut therein so as to render the member slightly resilient.

A further object is to provide improved means for engaging and disengaging the driving and driven members.

Another object is to combine and organize the various instrumentalities herein described so that they will effectively perform the functions set forth.

The invention herein described will be understood from the following specification when read in connection with the accompanying drawings in which similar characters represent similar parts in the several views.

In the drawings:

Fig. 1 is a longitudinal section showing the clutch assembly and associated parts.

Fig. 2 is a detail view of an improved form of clutch disc, being a section on line 2—2 of Fig. 1.

Fig. 3 is a side elevation of said clutch plate.

Fig. 4 is a section on line 4—4 of Fig. 1, parts being broken away in the interest of clearness.

Fig. 5 is a front view of a self-lubricating clutch collar.

Fig. 6 is an exaggerated diagrammatic detail.

In the drawings, 1 represents the rear end of an engine crank-shaft which is formed with a flange 2 to which the fly wheel 3 is secured by bolts 4 passing through suitable holes in the web 5 of the fly wheel. The fly wheel is formed with a rearwardly extending annular flange 6 and outer gear teeth 7 for co-action with the starting motor. The inner face of the web 5 is lined with a loosely fitting ring of friction material 8 which with the fly wheel constitutes one element of the clutch. The other element comprises our improved form of resilient clutch disc 9 which has an inner conoidal portion 10 and an outer substantially flat disc-like portion 11, in which are cut a plurality of saw kerfs 12 which extend a short distance beyond the line of flexure 13 between the flat portion 11 and the conoidal portion 10. The innermost portion of the clutch disc 9 is flattened at 14 and is formed with an opening 15 which seats against a shoulder 16 formed in a circular flange 17 on the end of a power transmitting shaft 18. The clutch disc is secured to this circular flange by a series of rivets 19 which pass through suitable apertures formed in the portion 19 of the disc and the flange 17. In making the clutch disc the flat faces of the portion 11 of the clutch disc are ground smooth and after this is done the saw kerfs are cut therein. This results in permitting the segments between adjacent kerfs to spring out of form a few thousandths of an inch, that is to say, the surface S (Fig. 6), at the periphery of the disc is in a plane in front of the surface S' near the line of flexure where the flat portion joins the conoidal portion as indicated in the exaggerated view.

This slight distortion or warping of the outer flat portion 11 of the clutch disc renders the disc slightly resilient so that when the disc is moved into engagement with the friction ring 8, the outer portion will first exert light yielding pressure on the friction ring 8 and as the clutch is allowed to come into further engagement, the whole surface of the portion 11 will be seated snugly against the friction ring so as to positively hold it in driving engagement with the driving member 3.

The front face of the clutch disc 9 co-operates with the loose friction ring 8 as above described and in juxtaposition to the rear face of the portion 11 of the clutch disc there is loosely mounted a second friction ring 20. Behind the friction ring 20 is located a pressure ring 21 having a notch 22 formed therein which engages a pin 23 secured in the flange 6 of the fly wheel, as shown in Fig. 4. The pressure ring is fitted with a plurality of bolts 24 having heads 25 formed thereon, which engage shoulders 26 formed in said pressure ring. Each bolt 24 is provided with a key 27 which fits in a suitable key seat cut in the pressure ring so as to prevent the bolt from turning. To the rear end of each bolt 24 is secured a nut 28 on which is formed a flange 29, the nut being provided with suitable screwthreads and being locked in place by a cotter pin 30. Associated with each bolt 24 is a pair of comparatively heavy springs 31 which are seated against spring retainers 32 and 33. The bolt 24 passes freely through openings formed in the spring retainers, as shown. Each spring retainer 32 is seated against the pressure ring 21 and each spring retainer 33 is seated against a clutch cover plate 34, which plate is secured by means of bolts 35 to the rear flange 6 of the fly wheel.

The clutch cover plate carries a plurality of fittings 36, each of which carries a stud 37 on which is pivotally mounted a dog 38 having jaws 39 arranged to engage the flange 29 of the nut 28 carried by each bolt 24. Each dog is provided with an elongated shank 40, the end of which fits in a groove 41 formed in a clutch collar 42, which is slidably mounted on a hub 43 extending rearwardly from the clutch cover plate 34. The clutch collar 42 is formed with a hollow chamber 44 and carries a lubricant O adapted to be splashed on the shaft 18 and adjacent parts, as fully described in an co-pending application Serial No. 492,950 filed concurrently herewith. This clutch collar is provided at the rear with an anti-friction thrust bearing 45 having an enlarged flange 46 against which the free ends 47 of a clutch collar operating yoke 48 impinge. This yoke is carried on a rock shaft 49 mounted in suitable bearings carried on any suitable part of the chassis. At the outer end the shaft 49 carries an arm 50, the end 51 of which engages a lug 52 formed on a foot operated clutch pedal 53, which is carried by a shaft 54 also mounted on the chassis.

The power transmitting shaft 18 is journaled at one end in a bushing 55 carried by the hub 43 of the clutch cover plate. This shaft is formed with an oil groove 56 which communicates with the interior chamber 44 of the clutch collar.

In operation the springs 31 normally exert sufficient force against the pressure ring 21 and friction ring 20 to hold the portion 11 of the resilient clutch disc flat against the friction ring 8, thereby positively establishing the driving connection between the fly wheel 3 and the power transmitting shaft 18. In order to throw out the clutch pressure is exerted on the foot pedal 53, which rocks the shaft 49 and yoke 48 to the left, as shown in Fig. 1. This action slides the clutch collar 42 to the left, which in turn rocks the dogs 40 about their pivots 37 so as to withdraw the several bolts 24, which in turn withdraw the pressure ring 21, thereby removing the friction between the fly wheel 3 and the clutch disc 9, thus disconnecting the driving element from the driven element. When it is desired to engage the clutch the operator slowly lifts his foot, thus permitting the springs 31 to expand. This will result first in bringing the extreme outer yielding portion 11 of the disc 9 into engagement with the friction ring 8. By this action both members will revolve, the driving member revolving at a higher rate of speed than the driven member because of the slight slippage. As the springs 31 further expand they will gradually exert sufficient pressure on the flat surface of the disc 9 to smoothly pick up and transmit the power to the driven shaft 18.

The kerfed formation of the clutch disc 9 permits the outer portion thereof to expand due to the heat generated by friction and still retain its shape. The kerfed formation also permits the different individual segments between the kerfs to yield independently to compensate for any inequalities in the thickness of the friction rings.

The clutch herein described is an improvement over structures of this class heretofore built and it is thought to present a decided advance in this art.

The clutch is simple in design and comprises a few parts which are readily and cheaply manufactured and assembled and yet it very effectively performs its function.

While we have described with great particularity the details of the embodiment herein shown, it is not to be construed that we are limited thereto as changes in arrangement and substitutions of mechanical equivalents may be made by those skilled in the art without departing from the invention, as pointed out in the appended claims.

Having thus described our invention what we claim as new and desire to secure by Letters Patent is:

1. A clutch including a drive shaft and a driving member and a driven member comprising a disc having an inner conoidal portion and an outer comparatively flat slightly dished portion said disc also having a plurality of kerfs formed therein to render it slightly resilient so that when it is moved into contact with the driving member it will smoothly and gradually pick up the load.

2. A clutch including a drive shaft and a driving member and a driven member comprising a disc having an inner conoidal portion and an outer comparatively flat portion, said disc also having a plurality of radial kerfs therein forming segments which are slightly sprung out of a plane and can yield independently of one another so as to compensate for inequalities of the surface with which said disc engages.

3. A friction clutch including a drive shaft and a driving member having a flat surface substantially perpendicular to the drive shaft and a driven member comprising a disc having an outer portion substantially parallel with the surface of the driving member and an inner conoidal portion, said disc also having a plurality of kerfs therein to form independently yielding slightly sprung segments, yielding means for normally holding the disc in operative engagement with the driving member and means associated with said yielding means for disengaging the disc from the driving member.

Signed this 9th day of August, 1921.

ALFRED T. STURT.
GEORGE H. ROBINSON.